(12) United States Patent
Leung

(10) Patent No.: US 7,338,157 B1
(45) Date of Patent: Mar. 4, 2008

(54) SPECTACLE

(76) Inventor: Yuet Charn Leung, Unit W, 7/F, Valiant Industrial Centre, 2-12 Au Pui Wan St., Fotan, Shatin, N.T., Hong Kong (CN)

( * ) Notice: Subject to any disclaimer, the term of this patent is extended or adjusted under 35 U.S.C. 154(b) by 0 days.

(21) Appl. No.: 11/783,990

(22) Filed: Apr. 13, 2007

(51) Int. Cl.
*G02C 5/22* (2006.01)

(52) U.S. Cl. ......................................... 351/153; 16/228

(58) Field of Classification Search ................ 351/153, 351/140, 41, 111, 116, 119, 158; 16/228, 16/224
See application file for complete search history.

(56) References Cited

U.S. PATENT DOCUMENTS 5,570,492 A * 11/1996 Nakanishi .................... 16/228

6,260,965 B1 * 7/2001 Kroman et al. ............. 351/153
2002/0054272 A1 * 5/2002 Ebata .......................... 351/111
2007/0146626 A1 * 6/2007 Rossin ........................ 351/153

* cited by examiner

*Primary Examiner*—Hung X. Dang
(74) *Attorney, Agent, or Firm*—Abe Hershkovitz; Hershkovitz & Assoc.

(57) ABSTRACT

A spectacle has a body and two hinges. The body includes a frame, at least one glass and two temples. The temples are pivotally and respectively connected to the frame, and each temple has a hinge hole define through the temple. The hinges are held respectively in the hinge holes in the temples and are mounted between frame and the temples to respectively pivotally connect the temples to the frame. Each hinge has a base, a securing member and a connecting rod. The base has a bottom and an annular hooking groove defined around the base. The securing member is moveably mounted in the base and engages with the hinge hole in a corresponding one of the temples. The connecting rod is connected to the body and has a C-shaped hook detachably hooking around the hooking groove in the base.

13 Claims, 10 Drawing Sheets

SPECTACLE

BACKGROUND OF THE INVENTION

1. Field of the Invention

The present invention relates to a spectacle, and more particularly to a spectacle with detachable and changeable temples.

2. Description of Related Art

A conventional spectacle substantially comprises a frame and two temples pivotally connected to the frame with hinges. Accordingly, a user can wear the spectacle with putting the temples on the ears. The conventional hinges on the spectacle each substantially comprise a bolt extending through the frame and the corresponding temple. With the hinges, the temples can be pivoted relative to the frame to fold the spectacle into a folded condition for conveniently carrying or storing when the spectacle is not in use.

However, with the arrangement of the conventional hinges, to unscrew the bolts with tools, such as screwdriver is necessary for detaching the temples from the frame of the spectacle, so to replace temples from the frame is very trouble and difficult. With the unchangeable temples, the aesthetic effect of the conventional spectacle is not versatile and attractive.

To overcome the shortcomings, the present invention tends to provide a spectacle to mitigate or obviate the aforementioned problems.

SUMMARY OF THE INVENTION

The main objective of the invention is to provide a spectacle with detachable and changeable temples to improve the convenience of using and aesthetic of the appearance of the spectacle. The spectacle has a body and two hinges. The body includes a frame, at least one glass and two temples. The frame has two ends, and the at least one glass is mounted on the frame. The temples are pivotally and respectively connected to the ends of the frame, and each temple has a hinge hole define through the temple and having a bottom. The hinges are held respectively in the hinge holes in the temples and are mounted between frame and the temples to respectively pivotally connect the temples to the frame. Each hinge comprises a base, a securing member and a connecting rod. The base has a bottom and an annular hooking groove defined around the base. The securing member is moveably mounted in the base and engages with the hinge hole in a corresponding one of the temples. The connecting rod is connected to the body and has a C-shaped hook detachably hooking around the hooking groove in the base.

Other objects, advantages and novel features of the invention will become more apparent from the following detailed description when taken in conjunction with the accompanying drawings.

DETAILED DESCRIPTION OF PREFERRED EMBODIMENT

Figure 1:
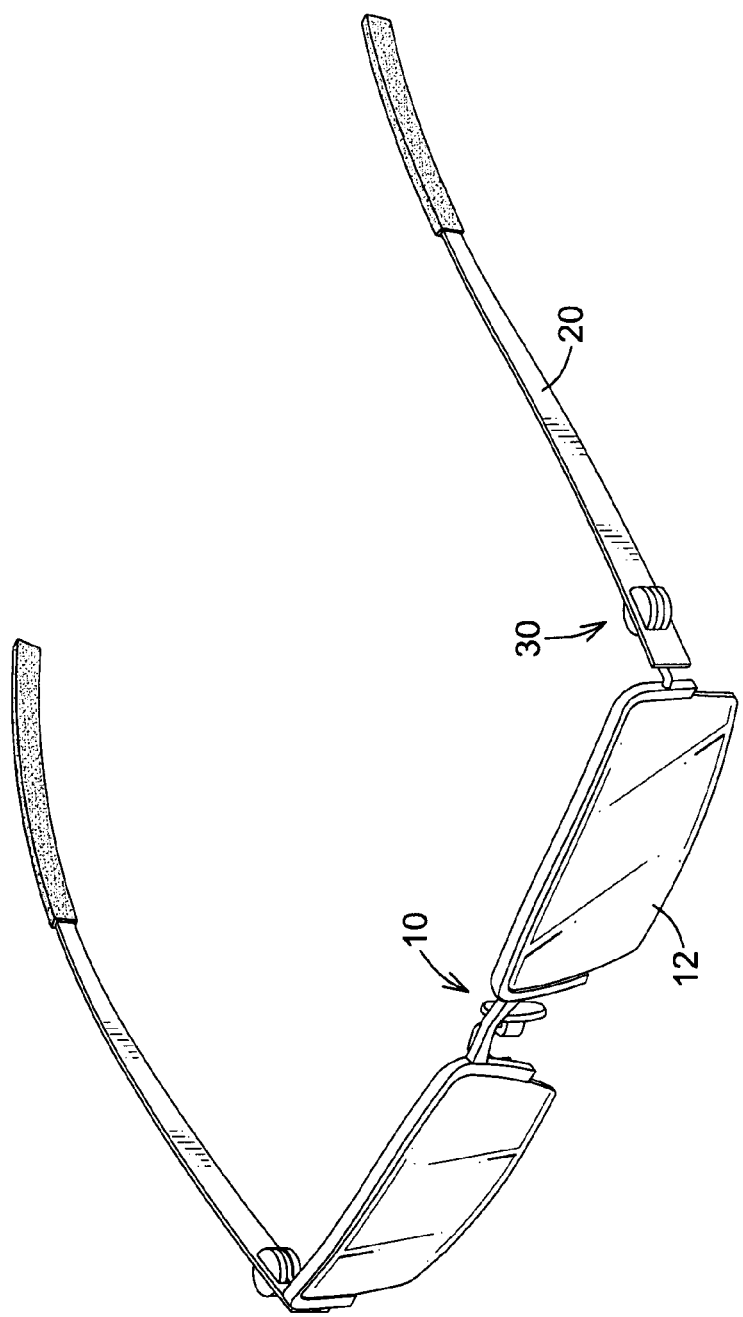
FIG. 1 is a perspective view of a first embodiment of a spectacle in accordance with the present invention.
Figure 2:
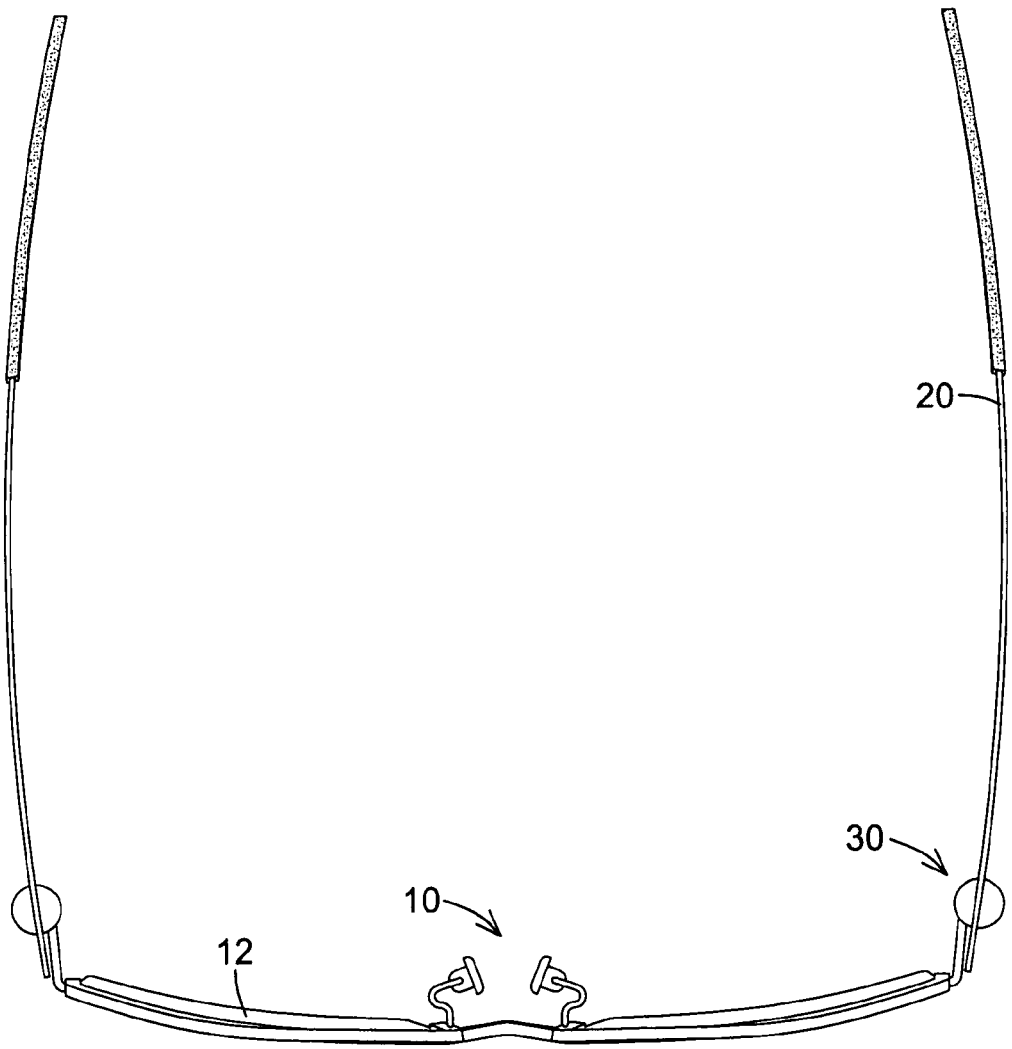
FIG. 2 is a top view of the spectacle in FIG. 1.

With reference to FIGS. 1 to 5, a spectacle in accordance with the present invention comprises a body and two hinges (30). The body comprises a frame (10), at least one glass (12) and two temples (20). The frame (10) has two ends. The at least one glass (12) is mounted on the frame (10), in this embodiment, two glasses (12) are mounted on the frame (10). The temples (20) are pivotally and respectively connected to the ends of the frame (10). Each temple (20) has a hinge hole (22) define through the temple (20), and the hinge hole (22) has a bottom.

The hinges (30) are held respectively in the hinge holes (22) in the temples (20) and are mounted between frame (10) and the temples (20) to respectively pivotally connect the temples (20) to the frame (10). Each hinge (30) comprises a base (32), a securing member and connecting rod (14). The base (32) has a bottom and an annular hooking groove (326) defined around the base (32) to divide the base (32) into an upper block (322), a neck and a lower block (324). The neck is mounted between the upper and lower blocks (322,324) and has a diameter smaller than that of the upper and the lower blocks (322,324) to define the hooking groove (326) around the neck. The base (32) has a central hole (328) defined in the bottom of the base (32), and the central hole (328) has a bottom.

The securing member is moveably mounted in central hole (328) in the base (32) and engages with the hinge hole (22) in a corresponding one of the temples (20). The securing member comprises a securing block (36) and a positioning bolt (366). The securing block (36) is moveably mounted inside the central hole (328) in the base (32) and has a bottom, an engaging groove (362) and a threaded hole (364). The engaging groove (362) is defined in the bottom of the securing block (36) and engages with the bottom of the hinge hole (22) in the corresponding temple (20). The threaded hole (364) is defined longitudinally through the securing block (36). The positioning bolt (366) is screwed through the threaded hole (364) in the securing block (36) and has a free end abutting against the bottom of the central hole (328) in the base (32).

The connecting rod (14) is connected to the body and has a C-shaped hook (142) detachably hooking around the hooking groove (326) in the base (32) to connect the hinge (30) to the body of the spectacle. In the first embodiment, the connecting rod (14) is securely connected to the frame (10) of the body and the C-shaped hook (142) is formed on one end of the connecting rod (14) opposite to the frame (10). With the engagement between the C-shaped hook (142) and the hooking groove (326) in the base (32), the base (32) is rotatably connected with the connecting rod (14).

Figure 3:
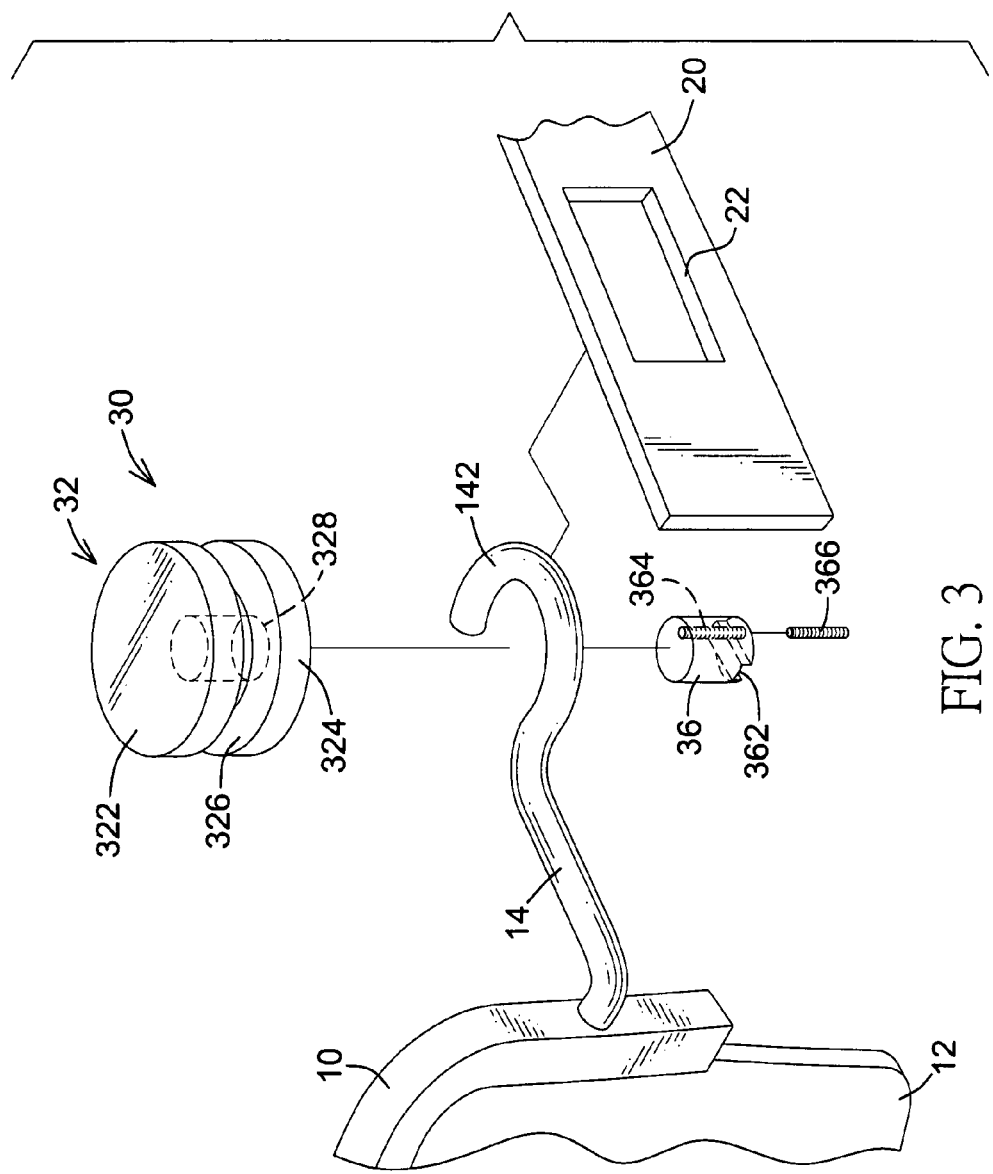
FIG. 3 is an exploded perspective view of a hinge of the spectacle in FIG. 1.
Figure 4:
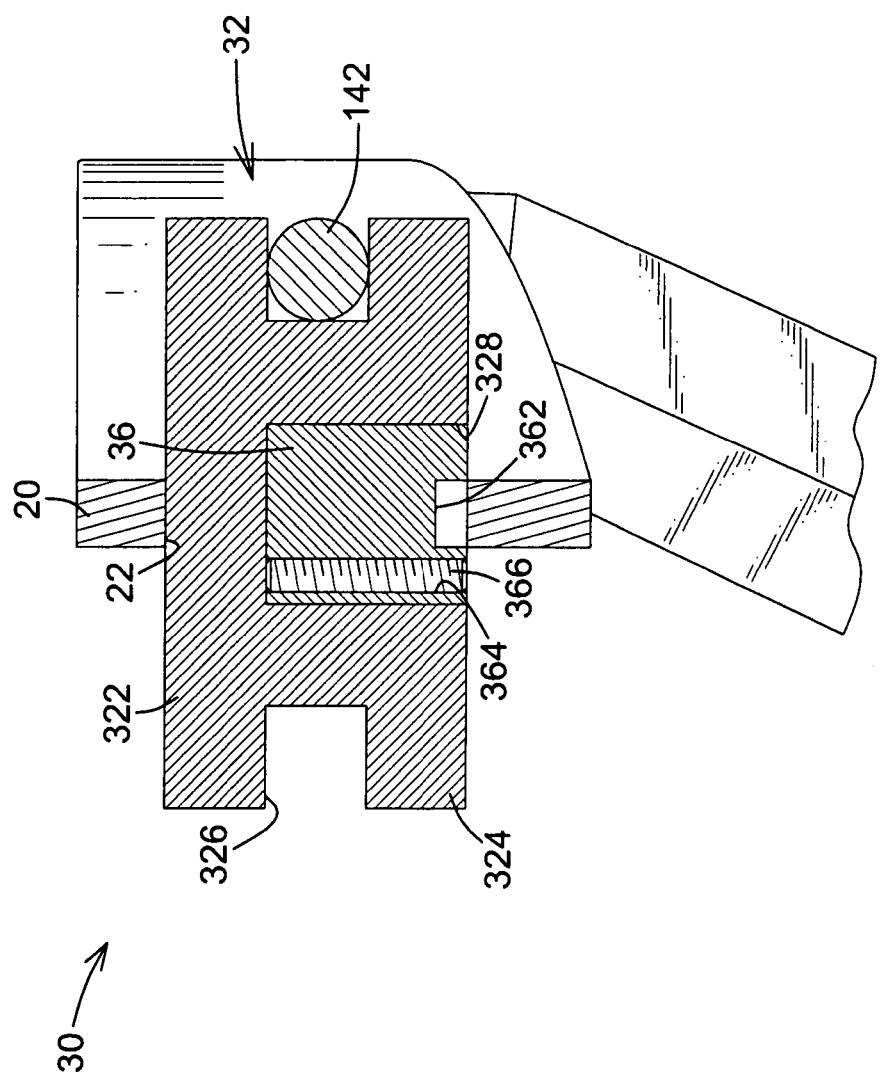
FIG. 4 is a side view in partial section of the hinge in FIG. 3 showing that the hinge is in an unlocked condition.
Figure 5:
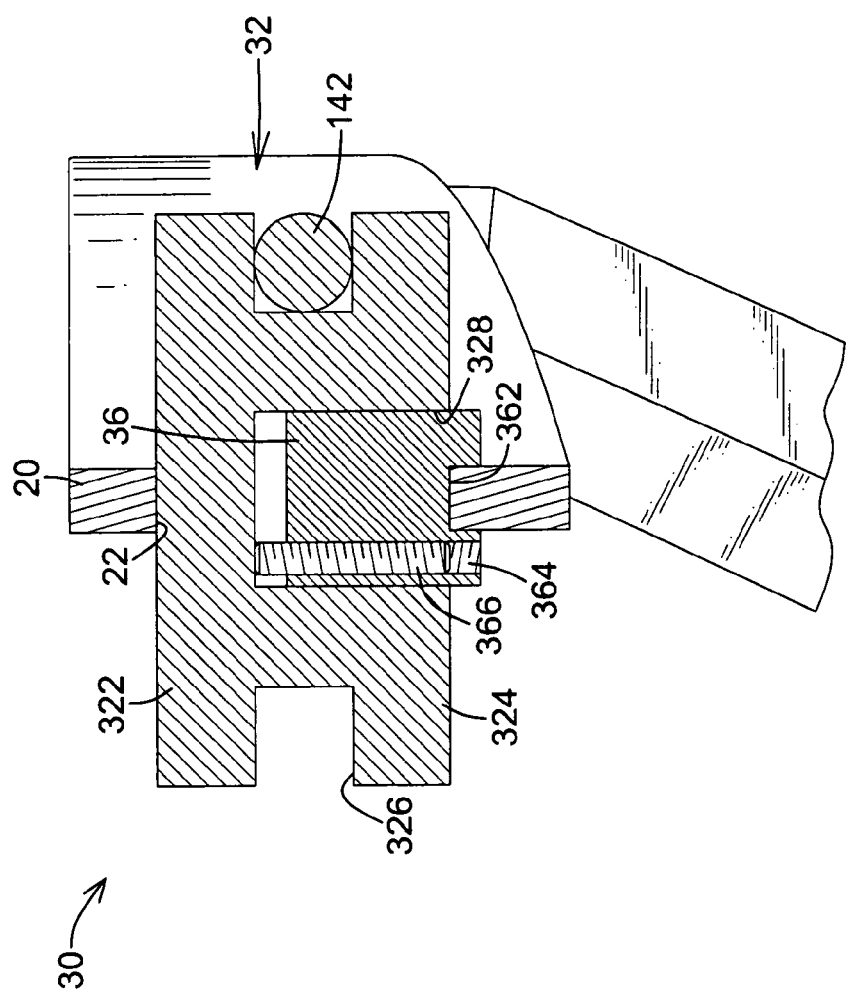
FIG. 5 is a side view in partial section of the hinge in FIG. 3 showing that the hinge is in a locked condition.

With reference to FIGS. 3 to 5, to pivotally connect a temple (20) to the frame (10) with the hinge (30), the C-shaped hook (142) on the connecting rod (14) is hooked around the hooking groove (326) in the base (32) and the base (32) is put inside the hinge hole (22) in the temple (20). The positioning bolt (366) is rotated along the threaded hole (364) in the securing block (36) to make the free end of the positioning bolt (366) abutting against the bottom of the central hole (328) in the base (32). Keeping rotating the positioning bolt (366), the securing block (36) will move downward to make the engaging groove (362) engaging with the bottom of the hinge hole (22) in the corresponding temple (20). With the engagement between the engaging groove (362) and the hinge hole (22), the base (32) is securely mounted in the hinge hole (22) in the temple (20), and the temple (20) is pivotally connected to the frame (10) with the hinge (30).

When the temples (20) are pivoted relative to the frame (10), the bases (32) of the hinges (30) will rotated with the temples (20) relative to the C-shaped hooks (142) on the connecting rods (14) to allow the spectacle to be folded into a collapsed condition.

Figure 6:
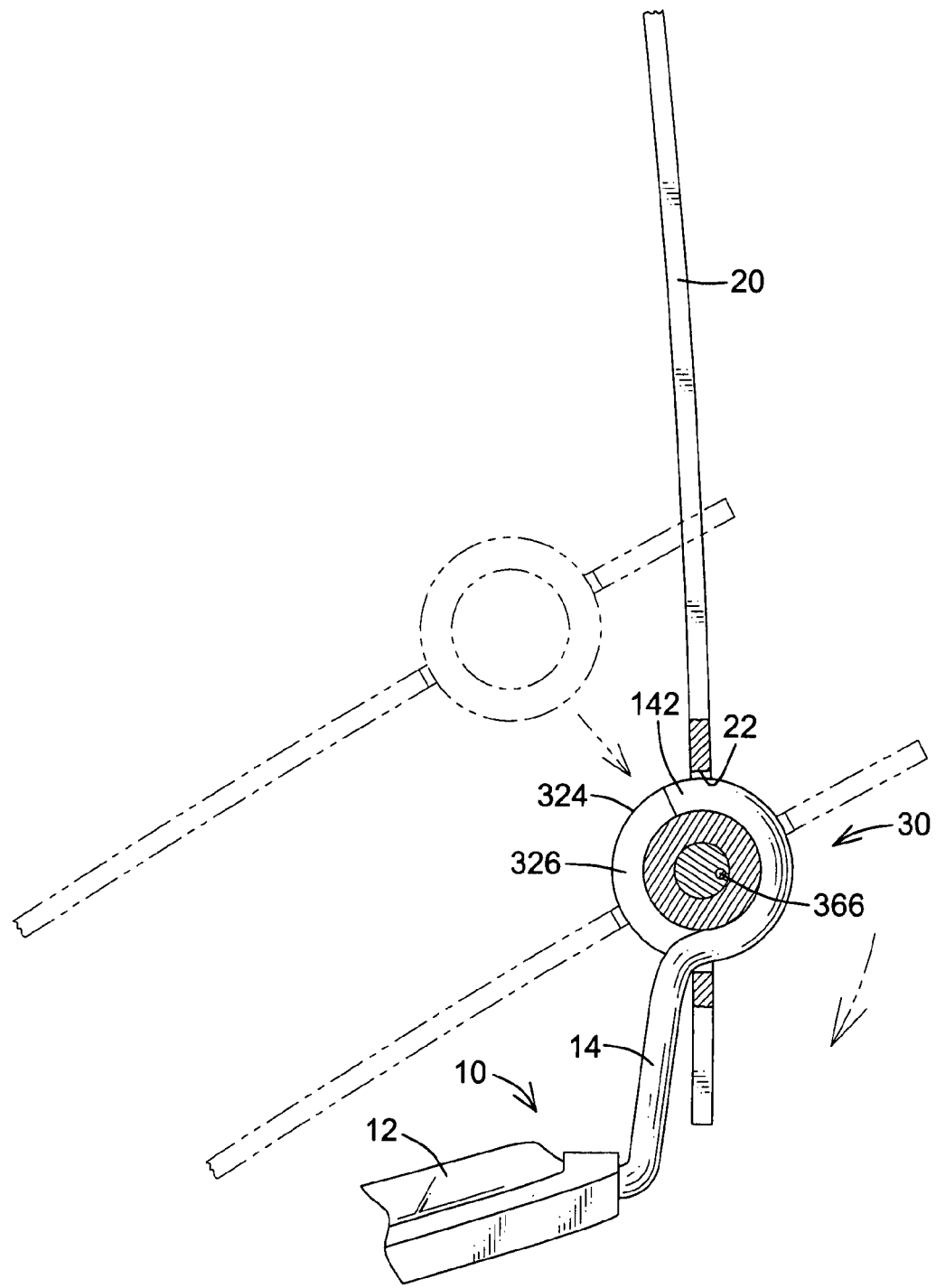
FIG. 6 is an operational top view in partial section of the spectacle in FIG. 1 showing that the temple is detached from the frame.

With reference to FIG. 6, when the C-shaped hook (142) on the connecting rod (14) is disengaged from the hooking groove (326) in the base (32), the temple (20) can be detached from the frame (10) and another temple (20) having different type or appearance and a base (32) mounted on can be connected to the connecting rod (14). Consequently, the temples (20) can be easily and conveniently replaced with another without using tools, such that the convenience of using and appearance of the spectacle are improved.

Figure 7:
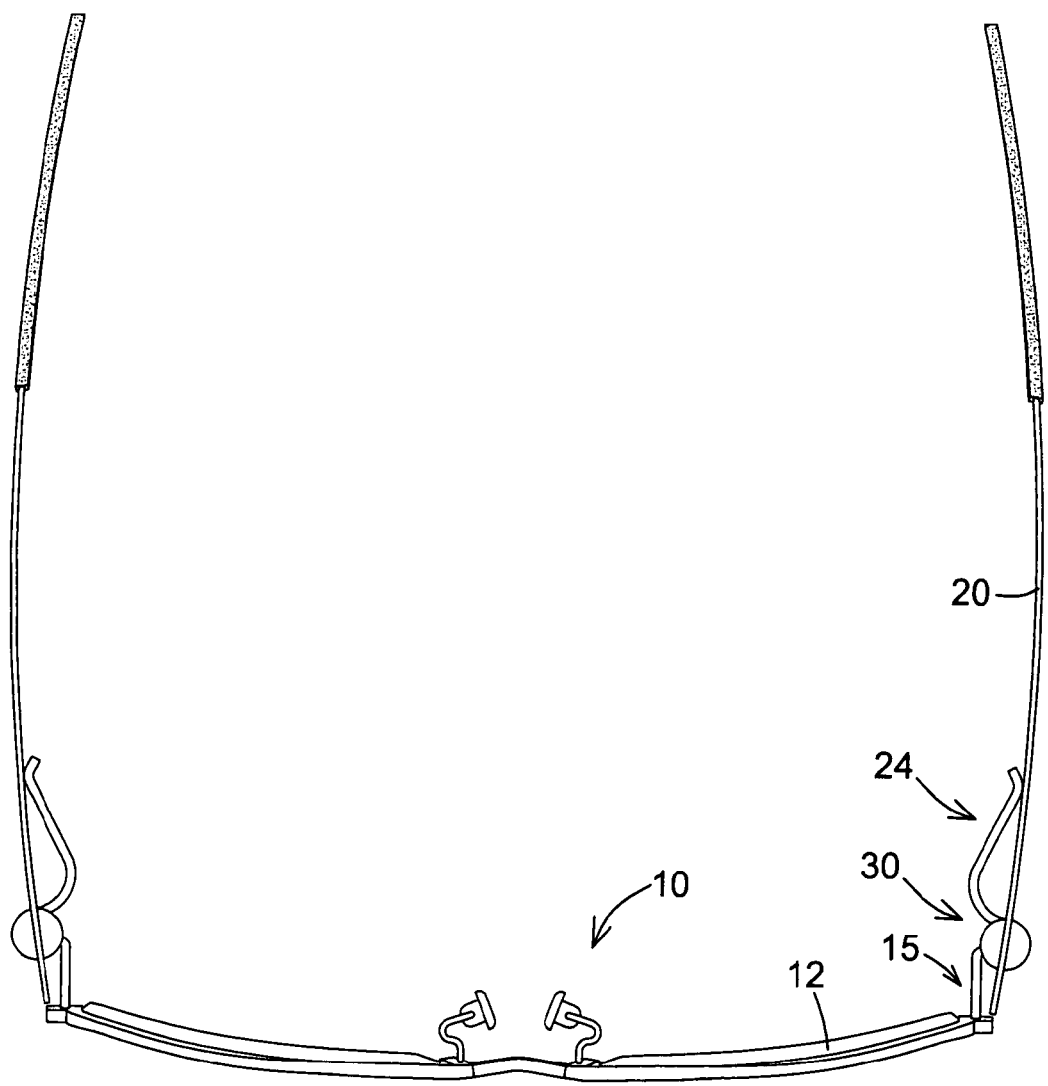
FIG. 7 is a top view of a second embodiment of a spectacle in accordance with the present invention.
Figure 8:
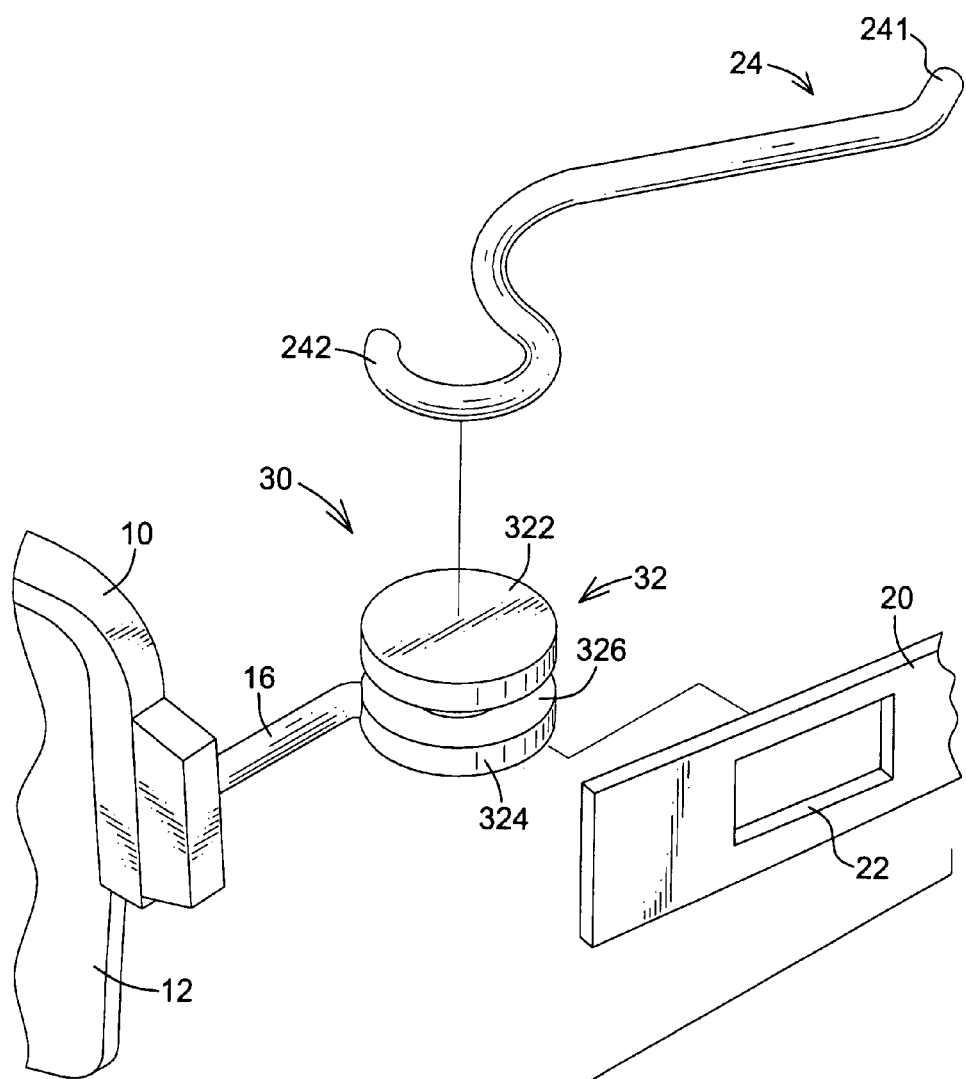
FIG. 8 is an exploded perspective view of a hinge of the spectacle in FIG. 7.
Figure 9:
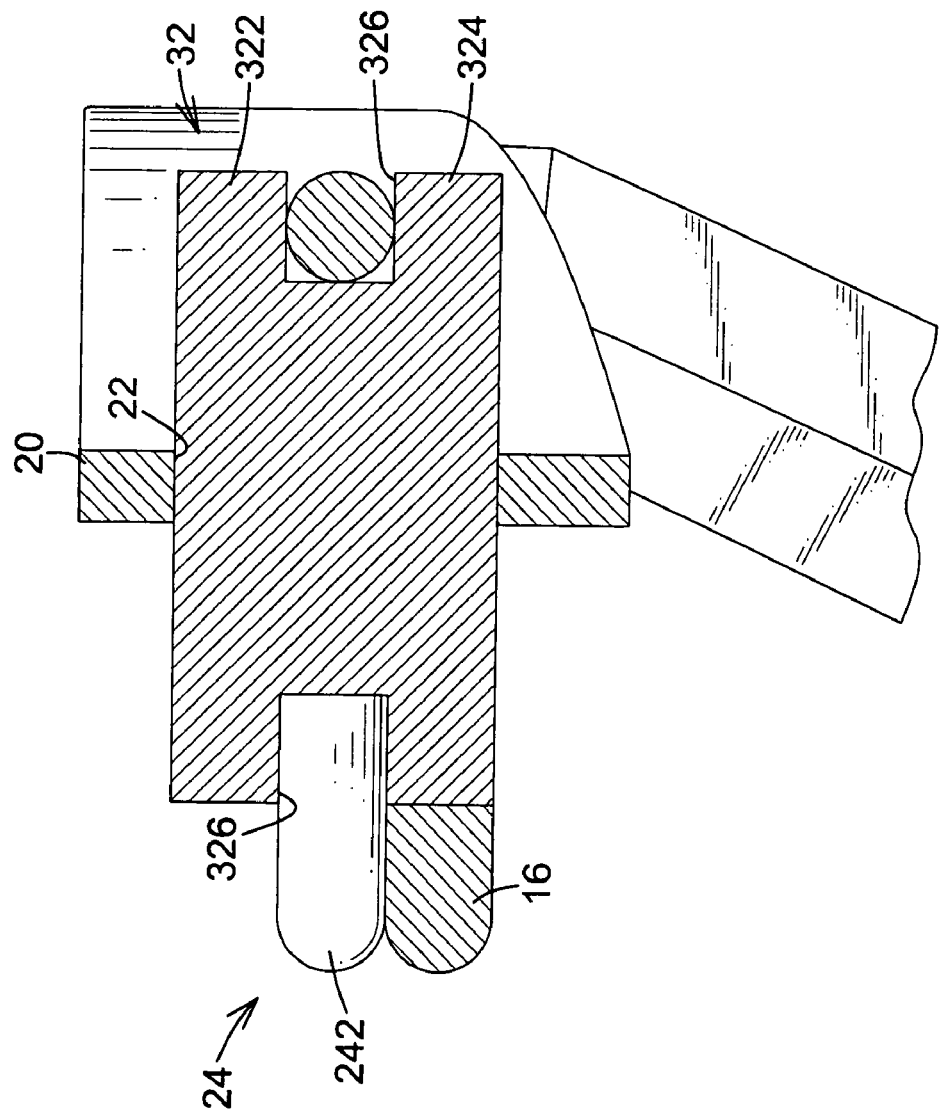
FIG. 9 is a side view in partial section of the hinge in FIG. 8.

With reference to FIGS. 7 to 9, in a second embodiment, the connecting rod (24) is securely connected to the temple (20) and each hinge (30) further comprises a linking rod (16) securely connected between the frame (10) of the body and the base (32) of the hinge (30). The connecting rod (24) is S-shaped, has a securing end (241) securely connected to the temple (20) with a welding process and the C-shaped hook (242) is formed on one end of the connecting rod (24) opposite to the securing end (241). The linking rod (16) is securely connected to the lower block (324) of the base (32) and the frame (10) with welding processes. With the engagement between the hooking groove (326) in the base (32) and the C-shaped hook (242) on the connecting rod (24), the temple (20) is pivotally but detachably connected to the frame (10).

Figure 10:
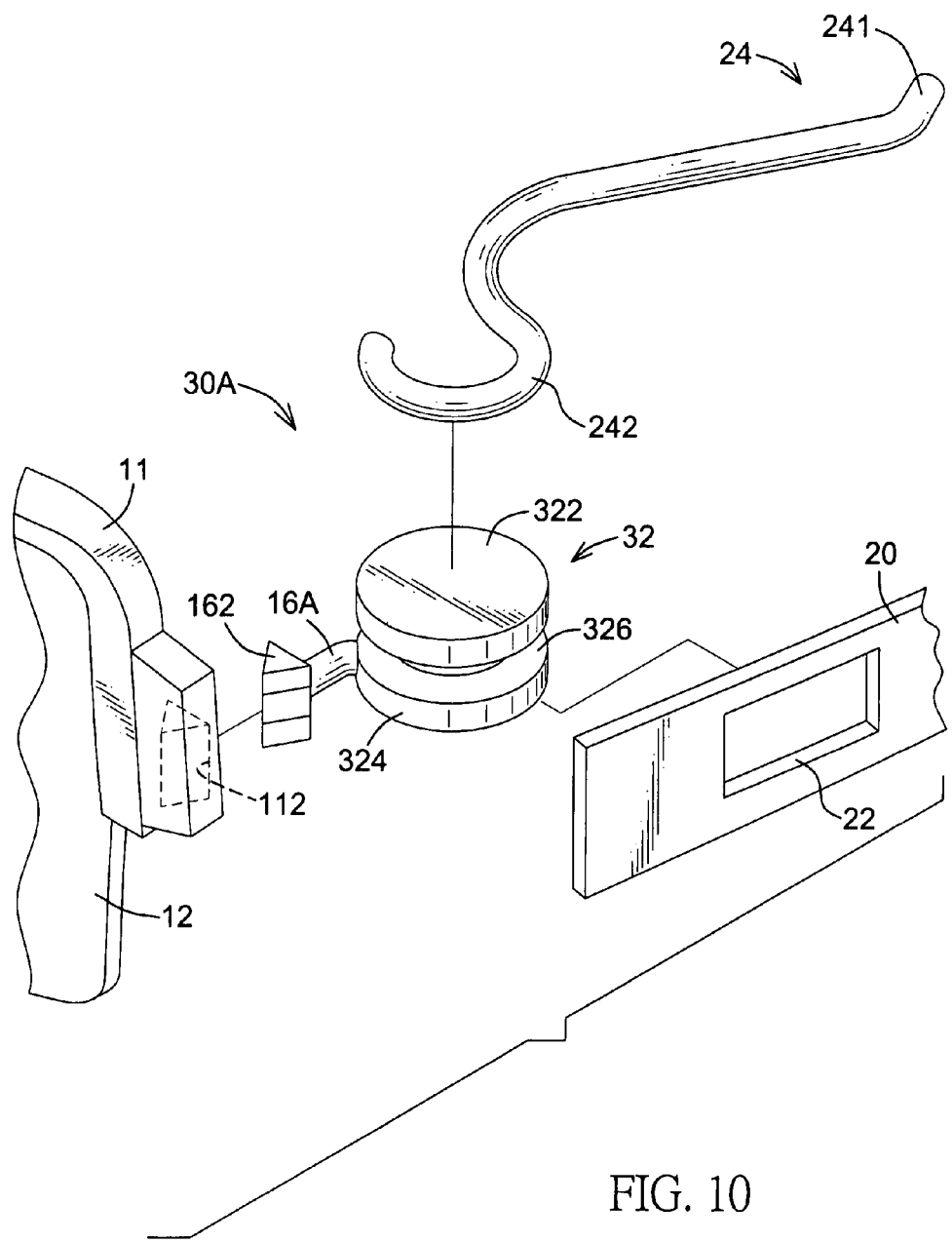
FIG. 10 is an exploded perspective view of a third embodiment of a hinge of a spectacle in accordance with the present invention.

With reference to FIG. 10, in a third embodiment, the linking rod (16A) of each hinge (30A) has an engaging block (162) attached to one end of the linking rod (16A). The frame (11) of the body has two engaging holes (112) defined in the frame (11) and holding respectively and securely the engaging blocks (162) of the hinges (30A) inside. The engaging block (162) is put into and securely held inside the corresponding engaging hole (112) with glue, the linking rod (16A) is securely attached to the frame (11) made of plastic material. Therefore, the spectacle in accordance with the present invention can be applied to metal or plastic material and is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A spectacle comprising:
a body including
a frame having two ends;
at least one glass mounted on the frame; and
two temples pivotally and respectively connected to the ends of the frame and each temple having a hinge hole define through the temple and having a bottom; and
two hinges held respectively in the hinge holes in the temples and mounted between frame and the temples to respectively pivotally connect the temples to the frame, and each hinge comprising
a base having a bottom and an annular hooking groove defined around the base;
a securing member moveably mounted in the base and engaging with the hinge hole in a corresponding one of the temples; and
a connecting rod connected to the body and having a C-shaped hook detachably hooking around the hooking groove in the base.

2. The spectacle as claimed in claim 1, wherein the base of each hinge has a central hole defined in the bottom of the base and having a bottom; and
the securing member of each hinge is held inside the central hole in the base of the hinge.

3. The spectacle as claimed in claim 2, wherein the securing member of each hinge comprises
a securing block moveably mounted inside the central hole in the base of the hinge and having
a bottom;
an engaging groove defined in the bottom of the securing block and engaging with the bottom of the hinge hole in a corresponding one of the temples; and
a threaded hole defined longitudinally through the securing block; and
a positioning bolt screwed through the threaded hole in the securing block and having a free end abutting against the bottom of the central hole in the base of the hinge.

4. The spectacle as claimed in claim 3, wherein each hinge further comprises a linking rod securely connected between the frame of the body and the base of the hinge.

5. The spectacle as claimed in claim 4, wherein the linking rod of each hinge has an engaging block attached to one end of the linking rod; and
the frame of the body has two engaging holes defined in the frame and holding respectively and securely the engaging blocks of the hinges inside.

6. The spectacle as claimed in claim 5, wherein the connecting rod of each hinge is securely connected to a corresponding one of the temples.

7. The spectacle as claimed in claim 6, wherein the connecting rod of each hinge is S-shaped.

8. The spectacle as claimed in claim 3, wherein the connecting rod of each hinge is securely connected to the frame.

9. The spectacle as claimed in claim 1, wherein each hinge further comprises a linking rod securely connected between the frame of the body and the base of the hinge.

10. The spectacle as claimed in claim 9, wherein the linking rod of each hinge has an engaging block attached to one end of the linking rod; and
the frame of the body has two engaging holes defined in the frame and holding respectively and securely the engaging blocks of the hinges inside.

11. The spectacle as claimed in claim 1, wherein the connecting rod of each hinge is securely connected to a corresponding one of the temples.

12. The spectacle as claimed in claim 11, wherein the connecting rod of each hinge is S-shaped.

13. The spectacle as claimed in claim 1, wherein the connecting rod of each hinge is securely connected to the frame.

* * * * *